United States Patent
Choi et al.

(10) Patent No.: US 11,748,926 B2
(45) Date of Patent: Sep. 5, 2023

(54) METHOD AND APPARATUS FOR PERFORMING PRIVACY MASKING BY REFLECTING CHARACTERISTIC INFORMATION OF OBJECTS

(71) Applicant: HANWHA TECHWIN CO., LTD., Seongnam-si (KR)

(72) Inventors: Jin Hyuk Choi, Seongnam-si (KR); Song Taek Jeong, Seongnam-si (KR); Jae Cheon Song, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/889,241

(22) Filed: Jun. 1, 2020

(65) Prior Publication Data

US 2020/0293767 A1 Sep. 17, 2020

Related U.S. Application Data

(63) Continuation of application No. 16/239,775, filed on Jan. 4, 2019, now Pat. No. 10,671,877.

(30) Foreign Application Priority Data

Mar. 9, 2018 (KR) .......................... 10-2018-0027792

(51) Int. Cl.
*G06T 11/60* (2006.01)
*G06T 11/00* (2006.01)
(Continued)

(52) U.S. Cl.
CPC ............ *G06T 11/60* (2013.01); *G06T 11/001* (2013.01); *G06T 11/40* (2013.01); *G06V 10/235* (2022.01);
(Continued)

(58) Field of Classification Search
CPC .. G06K 9/46; G06T 7/90; G06T 13/40; G06F 21/60
See application file for complete search history.

(56) References Cited

U.S. PATENT DOCUMENTS 10,595,060 B2 *   3/2020   Oya ................... H04N 21/4405
2009/0150199 A1 * 6/2009   Cohen ................ G06Q 10/0637
                                                     705/7.36

FOREIGN PATENT DOCUMENTS

KR   10-0588710 B1   6/2006
KR   10-0877747 B1   1/2009
(Continued)

OTHER PUBLICATIONS

Communication dated Apr. 25, 2018, issued by the Korean Intellectual Property Office in corresponding Korean Application No. 10-2018-0027792.
(Continued)

*Primary Examiner* — Ruiping Li
(74) *Attorney, Agent, or Firm* — Sughrue Mion, PLLC

(57) ABSTRACT

An image masking method is provided. The method includes: extracting an object from an image; obtaining characteristic information about the extracted object by analyzing the extracted object; determining whether the extracted object is a masking target according to an input setting value or the obtained characteristic information; and performing masking such that the obtained characteristic information is reflected on the extracted object, in response to determining that the extracted object is the masking target among a plurality of objects extracted from the input image, wherein the setting value is set by an input designating at least a partial region in the input image, and wherein in the determining whether the extracted object is the masking target, an object positioned in the at least a partial region is
(Continued)

determined as the masking target among the extracted objects.

9 Claims, 11 Drawing Sheets

(51) Int. Cl.
    *G06T 11/40*     (2006.01)
    *G06V 40/20*     (2022.01)
    *G06V 10/44*     (2022.01)
    *G06V 10/22*     (2022.01)
    *G06V 20/52*     (2022.01)
    *G06V 40/16*     (2022.01)

(52) U.S. Cl.
    CPC .............. *G06V 10/44* (2022.01); *G06V 20/52* (2022.01); *G06V 40/172* (2022.01); *G06V 40/20* (2022.01); *G06V 2201/07* (2022.01)

(56) References Cited

FOREIGN PATENT DOCUMENTS

| KR | 10-2013-0047223 A | 5/2013 |
| KR | 10-2013-0065567 A | 6/2013 |
| KR | 10-2013-0076992 A | 7/2013 |
| KR | 10-2016-0012362 A | 2/2016 |
| KR | 10-2016-0014798 A | 2/2016 |

OTHER PUBLICATIONS

Communication dated Jul. 2, 2018, issued by the Korean Intellectual Property Office in corresponding Korean Application No. 10-2018-0027792.

* cited by examiner

| Object ID | Time | Identity information | Color information | Size information | Position information |
|---|---|---|---|---|---|
| 1 | PM 3:30:00 | Person | Face : Yellow<br>Hair : Black<br>Top : Black<br>Bottom : Black | 220*340 | Public space (300, 600) |
| 2 | PM 3:30:00 | R.Green | Face : Yellow<br>Hair : Black<br>Top : Red, dot<br>Bottom : Black | 130*300 | Private space (1200, 500) |

METHOD AND APPARATUS FOR PERFORMING PRIVACY MASKING BY REFLECTING CHARACTERISTIC INFORMATION OF OBJECTS

CROSS-REFERENCE TO THE RELATED APPLICATIONS

This application is a continuation of U.S. application Ser. No. 16/239,775, filed Jan. 4, 2019, which claims priority from Korean Patent Application No. 10-2018-0027792, filed on Mar. 9, 2018, in the Korean Intellectual Property Office, the disclosure of which are incorporated herein by reference in their entireties.

BACKGROUND

1. Field

Apparatuses and methods consistent with exemplary embodiments of the invention relate to image processing by extracting objects and characteristic information about the objects from an image and performing privacy masking on the objects reflecting the characteristic information.

2. Description of the Related Art

Generally, a surveillance system has been widely used in various places including banks, stores, and residential areas. Such a surveillance system may be used for crime prevention and security purposes, but recently, has been also used to monitor pets or children in real time. The most popular surveillance system is a closed circuit television (CCTV) system photographing a desired region using a camera enabling a user to watch the desired region by monitoring an image photographed by the camera.

The surveillance system basically performs surveillance for that purpose, but may perform object masking to cover or obscure an object for the purpose of privacy protection and the like. For example, when an automated teller machine (ATM) is photographed by a camera at a bank, masking is performed so that an area in which a password is input is covered, thereby preventing acquisition of secret information.

Korean Patent Registration No. 10-0588170 (hereinafter, referred to as Prior Art 1) is an invention relating to a method for setting object masking in a surveillance system. The Prior Art 1 includes a technique of displaying a masking block preset by a user overlapping an object. Prior Art 1 uses square-shaped blocks selected in a single color to mask the object.

Korean Patent Registration No. 10-0877747 (hereinafter, referred to as Prior Art 2) is also an invention relating to object masking. Prior art 2 performs masking using a filtering method for blackening masking areas, a blurring method for mapping red, green and blue (RGB) values to average values of neighboring pixels, and a mosaic method for mosaicking.

However, in the Prior arts 1 and 2, since the main purpose is privacy protection, the masking is overly to prevent distinguishing a masked object or determining a motion of the object, and thus, an object monitoring function, which is the original purpose of a monitoring system, may be deteriorated.

SUMMARY

Exemplary embodiments of the inventive concept provide an image masking method and apparatus having both a privacy protection function and an object monitoring function.

The exemplary embodiments provide an image masking method and apparatus for performing masking by reflecting characteristic information about objects.

According to an exemplary embodiment, there is provided an image masking method in which a processor and a memory are included and an operation is controlled by the processor. The image masking method may include: extracting an object from an image; obtaining characteristic information about the object; determining whether the object is a masking target according to the characteristic information; and performing masking such that characteristic information about the object is reflected on the object, in response to determining that the object is the masking target.

According to an exemplary embodiment, there is provided image masking method which may include: extracting an object from an image; obtaining information about the object comprising characteristic information about the object; determining whether the object is a masking target according to a setting value and the information; and performing masking such that the characteristic information about the object is reflected on the object, in response to determining that the information about the object satisfies the setting value.

According to an exemplary embodiment, there is provided monitoring device including an input/output interface configured to receive an image captured by a camera, and at least one processor. The at least one processor may include: an object extractor configured to extract an object from the image; an object analyzer configured to obtain information including characteristic information about the object; an object determiner configured to determine whether the object is a masking target according to a setting value and the information; and an object processor configured to perform masking in the image such that the characteristic information about the object is reflected on the object, in response to determining that the information about the object satisfies the setting value.

The setting value may include at least one of color, shape, motion, identity, position, size, appearance time point, and appearance frequency of the object in the image.

The object processor may generate a masking object by reflecting the characteristic information on the object, and perform the masking on the object determined as the masking target using the generated masking object.

The masking object may be changed according to a change in the characteristic information about the object, and the masking object may be an avatar or a silhouette on which the characteristic information is reflected.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION OF THE EXEMPLARY EMBODIMENTS

Figure 1:
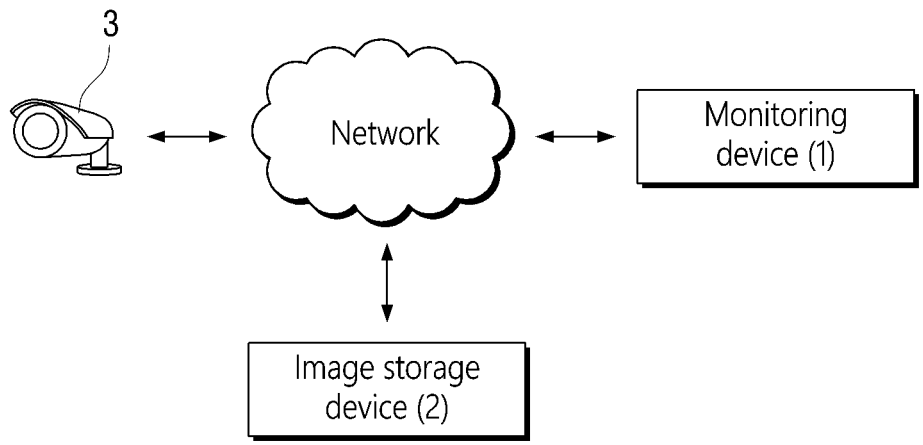
FIG. 1 illustrates a surveillance system according to an embodiment.

Embodiments of the inventive concept will be described in detail with reference to the accompanying drawings. It will be noted that all the embodiments described herein are exemplary. These embodiments will be described in detail in order to allow those skilled in the art to practice the inventive concept. It should be appreciated that various embodiments of the inventive concept are different, but are not necessarily exclusive. For example, specific shapes, configurations, and characteristics described in one embodiment may be implemented in another embodiment without departing from the spirit and the scope of the inventive concept. In addition, it should be understood that positions and arrangements of individual components in each disclosed embodiment may be changed without departing from the spirit and the scope of the inventive concept. Therefore, the detailed description provided below should not be construed as being restrictive. In addition, the scope of the inventive concept is defined only by the accompanying claims and their equivalents if appropriate. Throughout the drawings, the same reference numerals will refer to the same or like parts.

Unless otherwise defined, all terms including technical and scientific terms used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terms used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in the present disclosure, specify the presence of stated features, integers, steps, operations, elements, components, and/or combinations of them but do not preclude the presence or addition of one or more other features, integers, steps, operations, elements, components, and/or combinations thereof.

Hereinafter, various embodiments of the inventive concept will be described in detail with reference to the accompanying drawings.

FIG. 1 illustrates a surveillance system according to an embodiment. The surveillance system may include an image capturing device 3, an image storage device 2, and a monitoring device 1. An image captured by the image capturing device 3 may be stored in the image storage device 2 and/or displayed by the monitoring device 1.

The image capturing device 3 is a component for capturing an image, and various cameras may be used. Various types of cameras such as a zoom type camera, a dome type camera, a pan/tilt/zoom (PTZ) camera, an infrared (IR) camera, and a fisheye camera without being limited thereto may be used for the image capturing device 3.

The image capturing device 3 may be configured to be capable of wired/wireless communication with the image storage apparatus 2 and the monitoring device 1 for transmission and reception of the captured image and related data.

The image storage device 2 may be constituted by a network video recorder (NVR), a digital video recorder (DVR), a central monitoring system (CMS), and a video management system (VMS), without being limited thereto, as a device capable of storing the captured image.

The monitoring device 1 may be a CMS, a VMS, a personal computer (PC), a mobile device, or the like, as a device capable of displaying the captured image.

Although the imaging capturing device 3, the image storage device 2, and the monitoring device 1 are shown in FIG. 1 as separate devices, the devices may be constituted as a single device. For example, the image storage device 2 and the monitoring device 1 may be constituted by one VMS.

In the monitoring system according to the embodiment of the inventive concept, at least one of the imaging device 3, the image storage device 2, and the monitoring device 1 may have an image masking function. Hereinafter, a method of performing a masking operation on the monitoring device 1 will be described.

Figure 2:
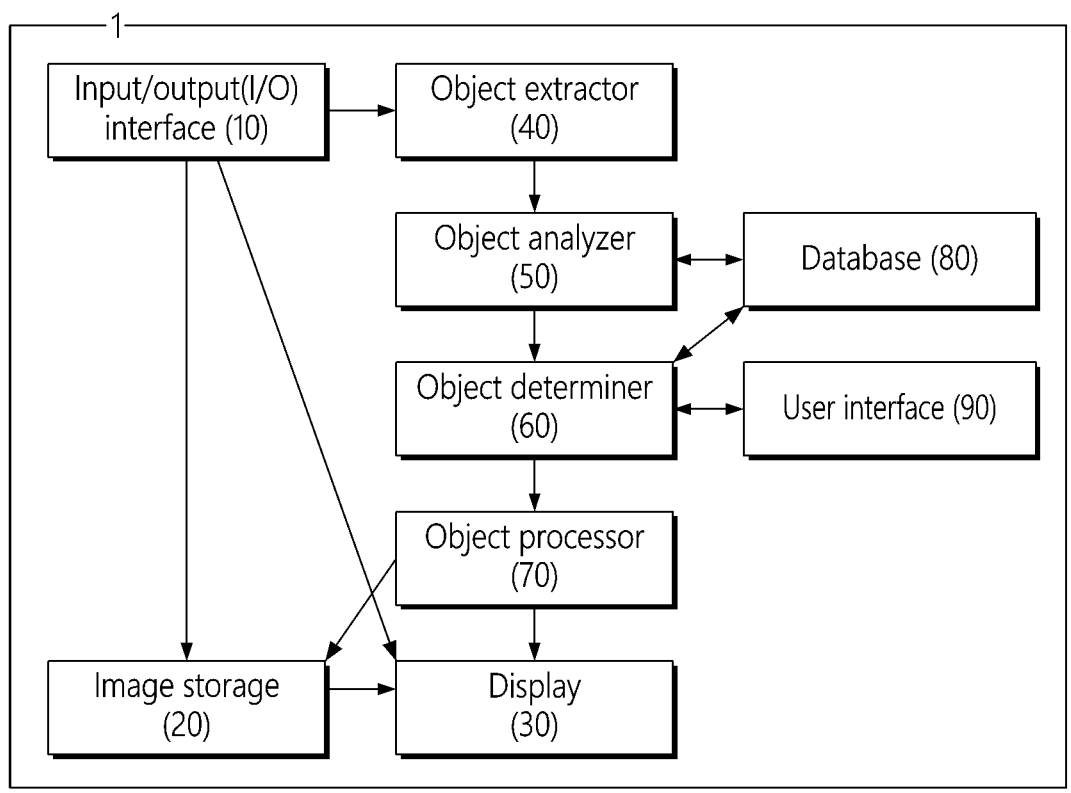
FIG. 2 illustrates a monitoring device according to an embodiment.

FIG. 2 illustrates a monitoring device according to an embodiment. The monitoring device 1 may include an input/output (I/O) interface 10, an object extractor 40, an object analyzer 50, an object determiner 60, an object processor 70, an image storage 20, a display 30, a database 80, and a user interface 90.

The I/O interface 10 may receive an image and transmit the received image to the image storage 20, the display 30, or the object extractor 40. The I/O interface 10 may receive the image from the image capturing device or the image storage device. Here, the I/O interface 10 may include any one or any combination of a digital modem, a radio frequency (RF) modem, a WiFi chip, and related software and/or firmware.

The image received by the I/O interface 10 may be a pre-masked image or a non-masked image. The I/O interface 10 may transmit a received image to the object extractor 40 if masking is required according to a type of the received image, or transmit the received image to the image storage 20 or the display 30 if masking is not required or necessary.

For example, if the received image is already masked and additional masking is not required, the I/O interface 10 may transmit the received image to the image storage 20 and the display 30 in order to store and output the received image. Otherwise, if the received image is already masked, but additional masking is required, or if the received image is a non-masked image, the I/O interface 10 may transmit the received image to the object extractor 40 for masking or additional masking of the received image.

The image storage 20 is a device for storing an image, and a storage medium may be used for storing data. The storage medium which may be used for the image storage 20 may include a hard disk drive (HDD), a solid state drive (SSD), a compact flash (CF), and a secure digital (SD) card, but the kind thereof is not limited thereto.

The display 30 may be constituted by a liquid crystal display (LCD), an organic liquid crystal display (OLED), a cathode ray tube (CRT), or a plasma display panel (PDP) as a device of outputting an image to a screen, but the kind thereof is not limited thereto.

An image transmitted to the object extractor 40 through the I/O interface 10 may be masked through the object analyzer 50, the object determiner 60, and the object processor 70. That is, the object extractor 40, the object analyzer 50, the object determiner 60, and the object processor 70 perform a series of operations for masking using general video analysis (VA), an image processing algorithm, and the like.

The object extractor 40 may perform an operation of extracting an object from an image. The object extracted by the object extractor 40 may include all objects distinguished from a background in the image. For example, the object extracted by the object extractor 40 may be a person, an animal, a vehicle, or the like.

The object extractor 40 may extract an object for each frame of the image or extract an object for a frame having a large amount of image information such as an I-frame.

The object analyzer 50 may perform an operation of analyzing characteristic information about the object extracted by the object extractor 40. The characteristic information may include information about color, shape, motion, position, size, and/or identity of the object, not being limited thereto.

The color information about the object means a color or a pattern representing the object in the image. The object analyzer 50 may extract a color or a pattern having the highest specific gravity constituting the object or extract an average value (for example, an RGB average value) of the color constituting the object to acquire the color information. In addition, the object analyzer 50 may extract a color or a pattern for each divided region by dividing the object or extract a color or a pattern constituting a specific region of the object to acquire the color information.

In the color information, the color may be classified and extracted as RGB values or names of colors such as red and black, and the pattern may be classified and extracted as names of patterns such as a dot, a stripe, and the like.

For example, if the object is a person, the object analyzer 50 may divide the person into a face, a hair, a top, and a bottom, and extract a color or a pattern for each part to acquire the color information. Alternatively, when the object is a vehicle and a specific region corresponds to a frame or body constituting an appearance of the vehicle, the object analyzer 50 may extract the color of the frame or body of the vehicle to acquire the color information.

The shape information about the object means a shape of the object projected on the image. The object analyzer 50 may extract a boundary line between the object and the background in the image to acquire the shape information.

The motion information about the object means information about a posture and an action taken by the object. The object analyzer 50 may extract the position of a specific point, such as a face, a hand, and a foot, from the object to acquire information about the posture and the action of the object.

The position information about the object means a point where the object is positioned. The object analyzer 50 may acquire the position information by calculating coordinates at which the object is positioned based on an arbitrary point of the image. Alternatively, the object analyzer 50 may divide the image into a plurality of sections and acquire a section where the object is positioned as the position information. Alternatively, the object analyzer 50 may acquire, as the position information, the background where the object is positioned on the image.

For example, the object analyzer 50 may acquire, as the position information, coordinates at which the object is positioned with respect to the center of the image. Alternatively, the image may be divided into two sections based on the center, and a 'left section' may be acquired as the position information when the object is positioned in the left section. Alternatively, when the image is obtained by capturing the kitchen and the living room indoor, and the object is positioned in the kitchen, the object analyzer 50 may acquire the 'kitchen' as the position information.

The size information about the object means a size of the object projected on the image. The object analyzer 50 may calculate horizontal and vertical lengths of a square in contact with the outermost line of the object to acquire the lengths as the size information. The horizontal and vertical lengths of the square may be measured in length units or the number of pixels.

The identity information about the object means information about a type of the object such as a person, an animal, and a vehicle, and/or information about an identity of the object such as a name, a title, and a product name. If the object is a person, information about gender, age, face shape, or impression may also be included. In the case of an animal or another object, identity information that can be separately discriminated may be included. The object analyzer 50 may extract feature points of the object and compare the feature points of the object with the database 80 to acquire the identity information about the object.

For example, the object analyzer 50 extracts the feature points of the person's face in the image and compares the extracted feature points with the database 80 to acquire the name of the matched person.

The object determiner 60 may perform an operation of determining whether the object extracted by the object extractor 40 is an object to be masked. The object determiner 60 may select all objects extracted by the object extractor 40 as a masking target. Otherwise, the object determiner 60 may select a specific object as the masking target from the extracted objects according to the characteristic information acquired by the object analyzer 50 and a setting value input to the monitoring device 2.

The setting value may be a pre-input value or a value input by a user through the user interface 90. The setting value may be a value for characteristic information (color, shape, motion, position, size, and/or identity). The setting value may be a value specifying a specific region in the screen. Also, the setting value may be a value related to time, and an object appearing at a specific time duration, an object appearing at a specific time point, an object appearing at a specific number of frames, or the like may be selected as the masking target. The setting value may also indicate sensitivity for detecting a dynamic object, and the sensitivity may be differently designated according to a region in the image.

Here, the sensitivity is a reference value for detecting a motion in the image. When a motion occurs in the image, a corresponding value is obtained, and the obtained value is compared with a predetermined sensitivity value, and if the obtained value satisfies the predetermined sensitivity value, it is determined that the motion occurs in the image.

For example, when the user adjusts up the sensitivity, a light motion is detected, and when the sensitivity is adjusted down, only a heavy motion is detected.

The object determiner 60 may select an object having the characteristic information satisfying the setting value as a masking target.

For example, when the setting value is 'top: red', the object determiner 60 may select an object, in which the color information about the top of the extracted object is classified in red, as a masking target.

As another example, when the setting value is 'position: kitchen', the object determiner 60 may select an object, in which the position information about the extracted object is classified as the kitchen, as a masking target.

As yet another example, when the setting value is 'name: R. Green', the object determiner 60 may select a person, in which the name is R. Green of the extracted object, as a masking target.

As still another example, when the setting value is a value designating a specific region in the screen, the object determiner 60 may select an object positioned in the specific region as a masking target.

As still yet another example, when the setting value is a value designating the sensitivity, the object determiner 60 may select a dynamic object satisfying a predetermined sensitivity as a masking target.

As still yet another example, when the setting value is a value designating sensitivity in a specific region in the screen, the object determiner 60 may select a dynamic object satisfying the designated sensitivity among the objects positioned in the specific region as a masking target.

That is, the user may set the sensitivity to a region where privacy is to be protected to be high, and the object having even a slight motion may be designated as a masking target. In this way, in a place such as a hospital divided into a private space where privacy is to be protected and a public space where the privacy is not protected, the sensitivity may be set to be low in the public space to enhance a monitoring function, and set to be high in the private space to enhance a privacy protection function.

As still yet another example, when the setting value is a value designating a time point, the object determiner 60 may select an object appearing at the designated time point as a masking target.

The object processor 70 may perform masking on an object determined as the masking target. The object processor 70 may mask an object selected based on characteristic information about at least one of color, shape, motion, position, size information, and identity of the object. Different from an actual object, a masking object is an object generated by reflecting the characteristic information about the actual object. The masking object reflects the characteristic information about the object, and when the characteristic information about the object is changed, the masking object may be changed according to the change in characteristic information about the object.

The masking object may be an avatar or a silhouette in which the characteristic information about the object is reflected.

The object processor 70 may perform masking on an object by covering the object with an avatar or a silhouette, which is a masking object created on the object, or masking by processing the object to be transparent and inserting an avatar or a silhouette, which is a masking object generated at a position of the object.

For example, if the color information about an object is 'face: black, hair: black, top: red, bottom: black', masking may be performed using an avatar constituted by black face and hair, a red top, and a black bottom. At this time, when the color information about the object is changed, such as when the object takes off clothes or changes the clothes, the color information about the avatar as the masking object may be changed. In addition, when the identity information about the object is 'gender: female and age: middle age', the masking may be performed using an avatar representing a middle-aged woman. Furthermore, it is possible to adjust the size of the avatar according to the size information about the object, and perform the masking by adjusting the position of the avatar according to the position information about the object.

In another example, the masking may be performing by generating the same silhouette as the object according to the shape information about the object. The interior of the silhouette may be filled with a random color or a color matched with the color information about the object.

As such, since the object is masked using an avatar or a silhouette obtained by reflecting the characteristic information about the object, it is possible to protect the privacy of the object while transmitting information about the object to the user (an object monitoring function).

An image masked by the object processor 70 may be transmitted and stored to the image storage 20 or may be transmitted and displayed at the display 30.

As such, since masking is performed using an avatar or a silhouette reflecting characteristic information about the object at the object processor 70, the user easily distinguishes the masked object, and information about impression, motion, and identity of the objects may be transmitted to the user.

Since the object extractor 40, the object analyzer 50, the object determiner 60 and the object processor 70 perform a series of operations for masking every frame (or every frame of a specific period), an avatar or a silhouette which is changed according to a motion of an object may be generated and masked.

Embodiments for processing images at the object analyzer 50, the object determiner 60, and the object processor 70 will be described in detail with reference to the above description.

Figure 3:
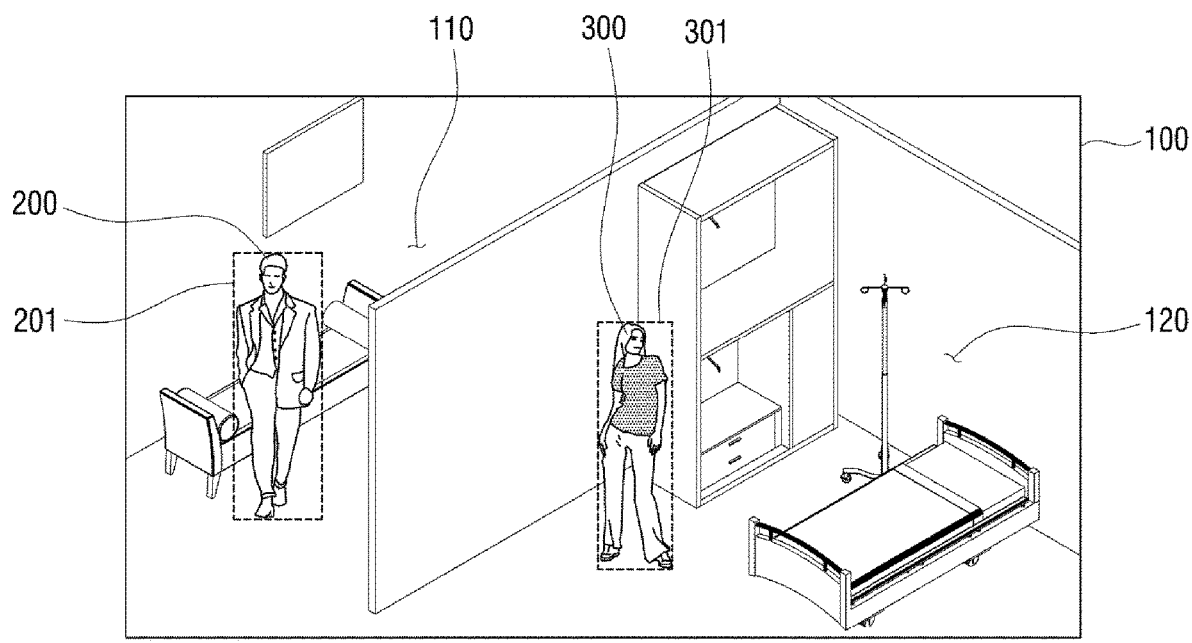
FIG. 3 illustrates an embodiment for obtaining characteristic information about an object at an object analyzer.

FIG. 3 illustrates an embodiment for acquiring characteristic information about an object in the object analyzer. In FIG. 3, the object extractor 40 extracts a first object 200 and a second object 300 from a received image 100. The object analyzer 50 extracts characteristic information about the first object 200 and the second object 300 extracted by the object extractor 40.

First, the object analyzer 50 extracts feature points of the face of the first object 200 and compares the extracted feature points with the database 80 to analyze whether the first object 200 is a registered person. In the embodiment, the first object 200 is a person who is not registered in the database 80, and the object analyzer 50 analyzes the identity of the first object 200 as 'person'.

The object analyzer 50 divides the first object 200 into a face, a hair, a top, and a bottom, and acquires color information by extracting a color that occupies the largest portion in each region. In the embodiment, the object analyzer 50 acquires color information of 'face: yellow, hair: black, top: black, bottom: black'.

The object analyzer 50 may acquire the size information through the horizontal and vertical lengths of a square 201 in contact with the outermost line of the first object 200. In the embodiment, the object analyzer 50 acquires size information of 'horizontal length: 220 mm, vertical length: 340 mm'.

The object analyzer 50 may acquire a region where the first object 200 is positioned as position information. In the embodiment, the background of the image 100 is divided into a public space 110 corresponding to a waiting room and a private space 120 corresponding to a care room in the hospital. The object analyzer 50 may acquire the 'public space' as the position information according to the background in which the first object 200 is positioned or acquire coordinates '(300, 600)' where a central point of the first object 200 is positioned based on a lower left end of the image as the position information.

Next, the object analyzer 50 extracts feature points of the face of the second object 300 and compares the extracted feature points with the database 80 to analyze whether the second object 300 is a registered person. In the embodiment, the second object 300 is a person who is registered in the database 80, and the object analyzer 50 analyzes 'R. Green', the name of the second object 300 as the identity information.

The object analyzer 50 divides the second object 300 into a face, a hair, a top, and a bottom, and acquires color information by extracting an average value of the colors in each region. In the embodiment, the object analyzer 50 acquires color information of 'face: yellow, hair: black, top: red/dot, bottom: black'.

The object analyzer 50 may acquire size information through the horizontal and vertical lengths of a square 301 in contact with the outermost line of the second object 300. In the embodiment, the object analyzer 50 acquires size information of 'horizontal length: 130 mm, vertical length: 300 mm'.

The object analyzer 50 may acquire a region where the second object 300 is positioned as position information. In the embodiment, the object analyzer 50 may acquire the 'private space' as the position information according to the background in which the second object 300 is positioned or acquire coordinates '(1200, 500)' where a central point of the second object 300 is positioned based on a lower left end of the image as the position information.

Figure 4:
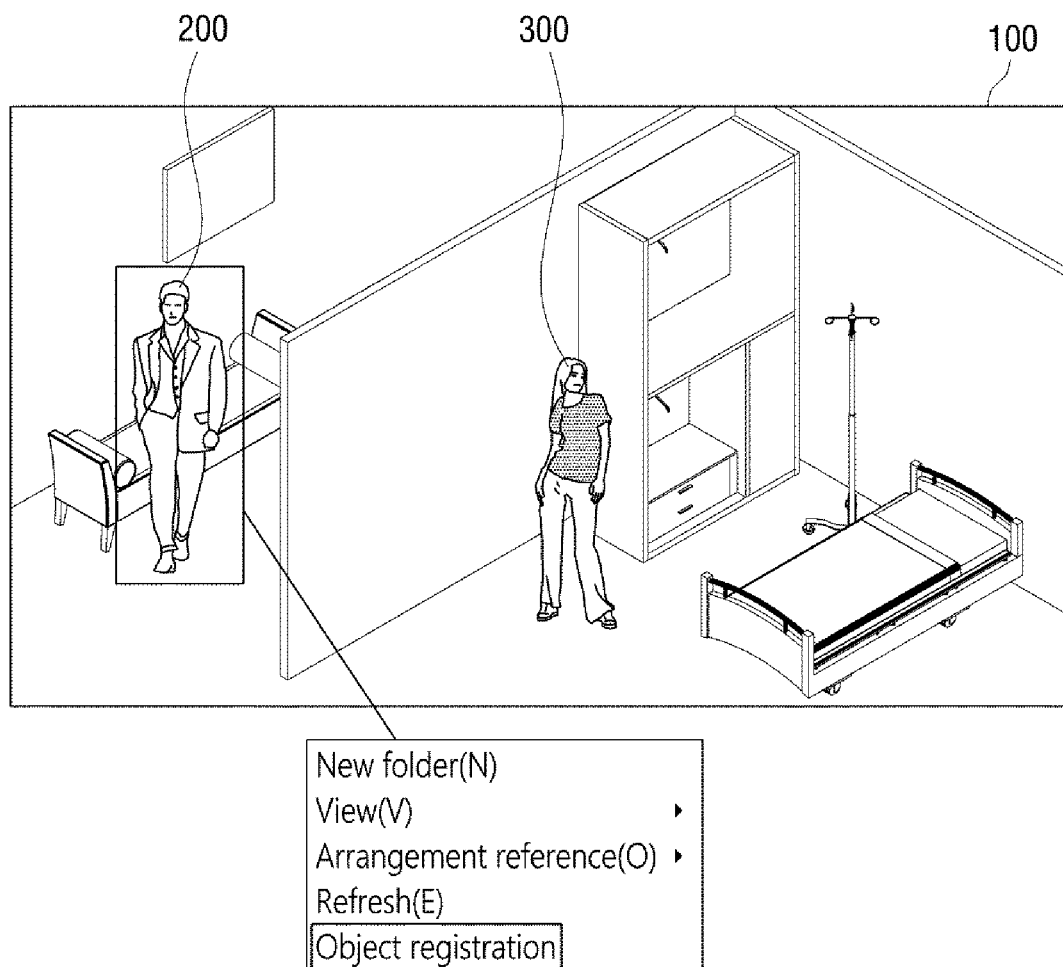
FIGS. 4 and 5 illustrate an embodiment of determining a masking target by an object determiner.
Figure 5:
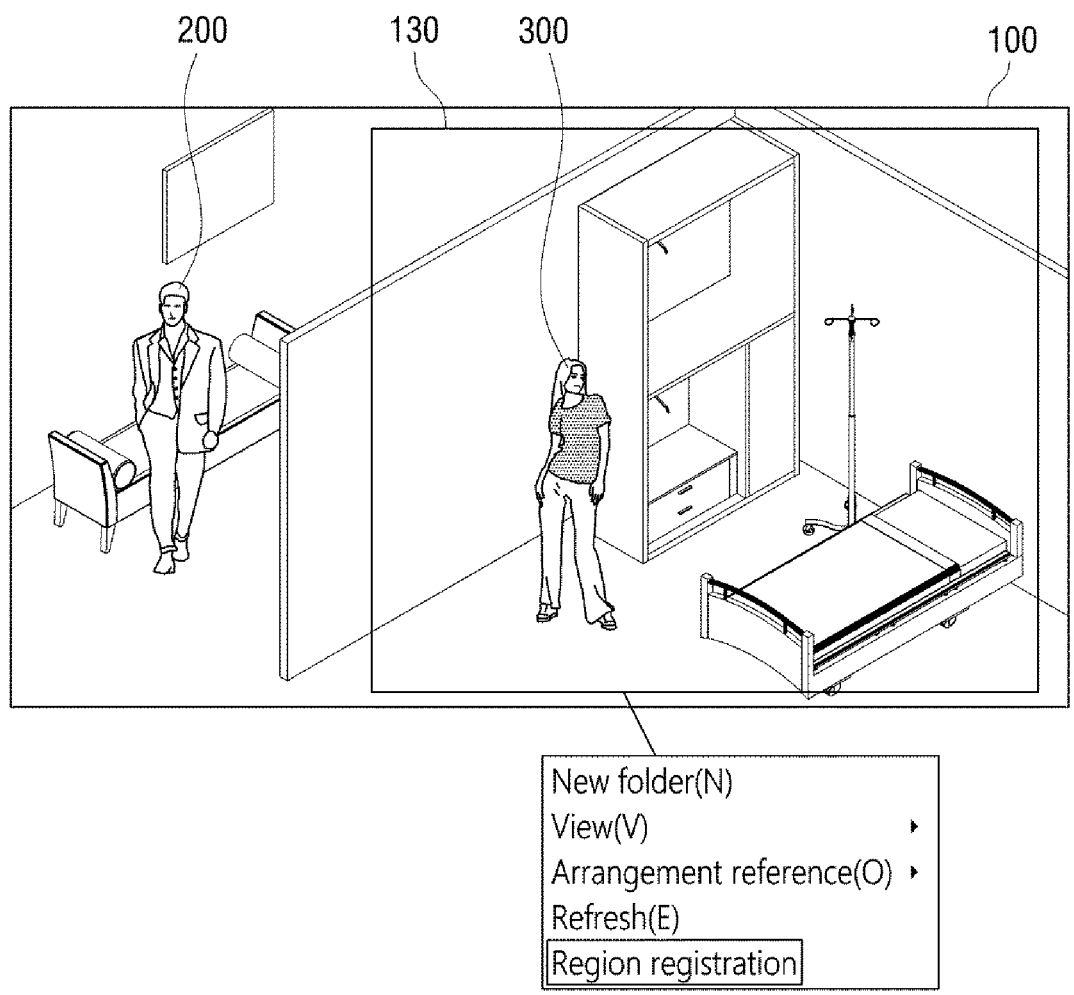

FIGS. 4 and 5 illustrate an embodiment of determining a masking target by the object determiner.

First, referring to FIG. 4, a user may designate the first object 200 as a masking target through the user interface 90 while monitoring the image 100. The object determiner 60 may select the first object 200 as a masking target according to an input in which the user selects the first object 200 and designates the first object 200 as the masking target. Accordingly, the object processor 70 performs masking on the first object 200 among the first object 200 and the second object 300.

Next, referring to FIG. 5, the user may designate the specific region 130 as a masking region through the user interface 90 while monitoring the image 100. The object determiner 60 may select the second object 300 positioned in the designated region 130 as the masking target according to an input of the user designating the region 130. If the first object 200 enters the designated region 130 and the second object 300 deviates from the designated region 130, the object determiner 60 selects the first object 200 as the masking target.

In this way, since only an object positioned in a designated region in an image can be masked, selective masking based on a space other than the object is possible. In a place such as a hospital divided into a private space where privacy is to be protected and a public space where the privacy is not protected, masking is not applied to the public space to enhance a monitoring function, and the masking is applied to the private space to enhance a privacy protection function.

The object determiner 60 may determine only an object having characteristic information satisfying a setting value among the same type of objects as a masking target. Only a person among a person, an animal, and a vehicle may be determined as a masking target, and only an object having characteristic information satisfying a setting value among a person, an animal, and a vehicle may be determined as the masking target. Alternatively, only one object may be determined as the masking target or only a predetermined number of objects may be determined as the masking target.

Figure 6:
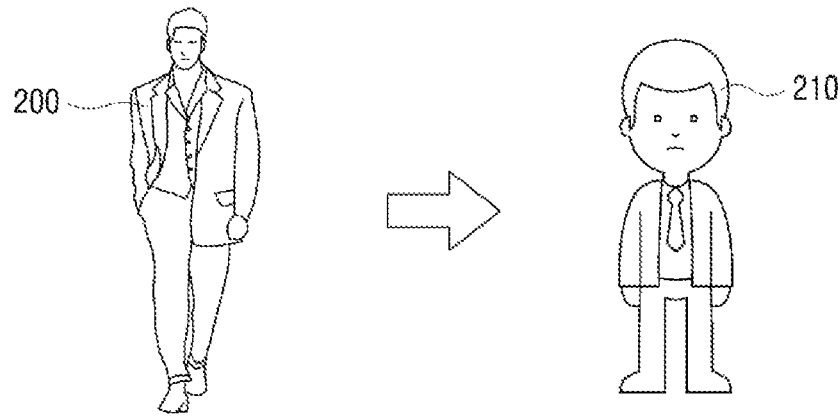
FIGS. 6 and 7 illustrate an embodiment of performing masking by an object processor.
Figure 6:
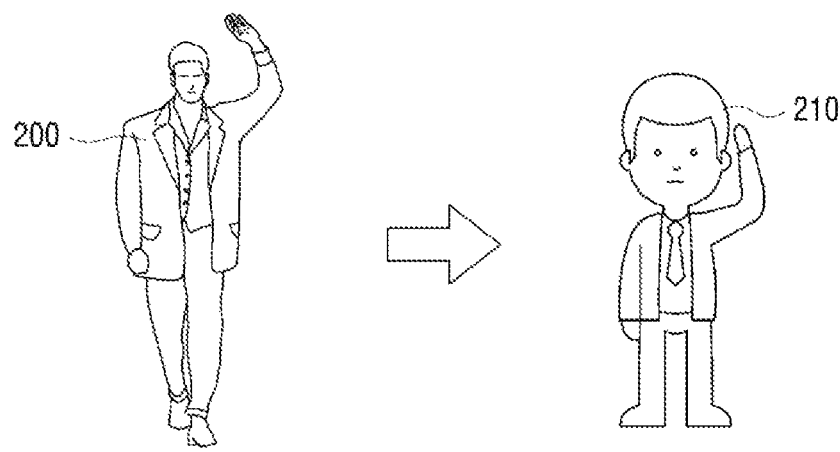
Figure 6:
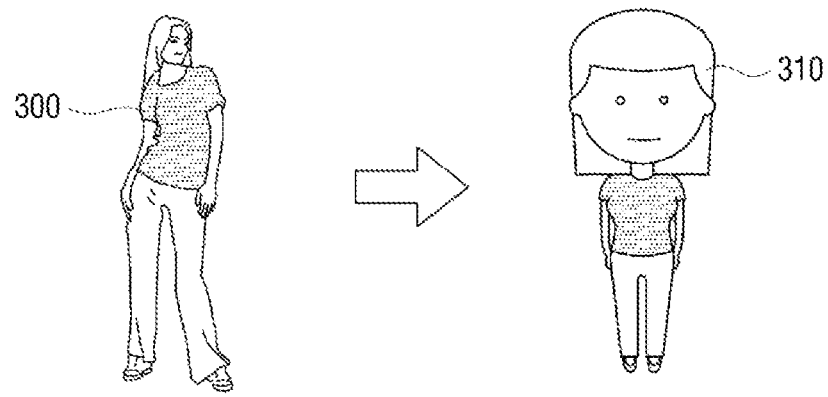
Figure 7:
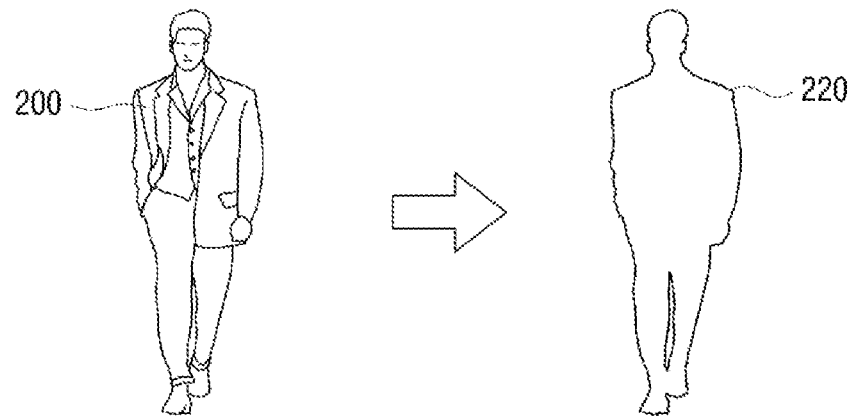
Figure 7:
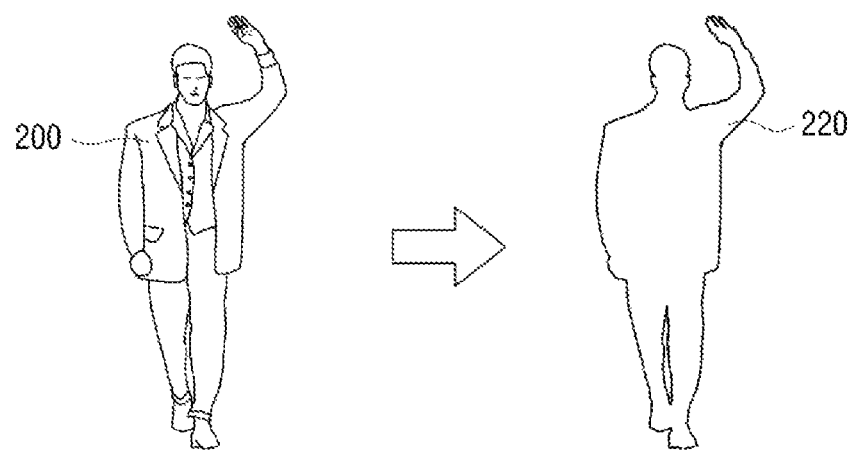
Figure 7:
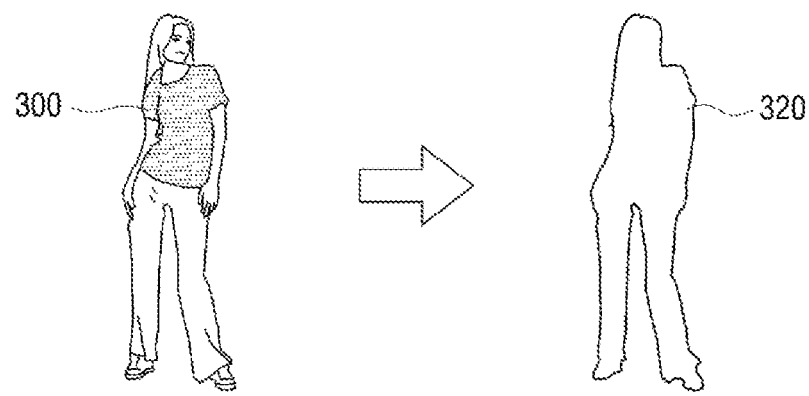

FIGS. 6 and 7 illustrate an embodiment of performing masking by the object processor.

First, referring to FIG. 6, the object processor 70 may perform masking on an object using an avatar that is obtained by reflecting characteristic information acquired by the object analyzer 50. The object processor 70 may generate an avatar 210 in which color information of 'face: yellow, hair: black, top: black, bottom: black' of the first object 200 is reflected. In addition, the avatar 210 changed according to a change in the motion of the first object 200 may be generated by reflecting motion information about the first object 200. When the color information is changed by taking off or changing clothes, the color of clothes of the object may also be changed. As such, the avatar may also be changed according to the change in the characteristic information about the object.

Similarly, an avatar 310 in which color information 'face: yellow, hair: black, top: red/dot, bottom: black' of the second object 300 is reflected may be generated. Alternatively, since the second object 300 is a registered person, an avatar having a pre-selected shape may be generated to match the corresponding person.

Next, referring to FIG. 7, the object processor 70 may generate a silhouette 220 according to shape information about the first object 200. The interior of the silhouette 220 may be filled with black, which is a color of the highest specific gravity of the first object 200. In addition, the silhouette 220 changed according to a change in the contour of the first object 200 may be generated by reflecting the shape information about the first object 200.

Similarly, the object processor 70 may generate a silhouette 320 according to shape information about the second object 300. The interior of the silhouette 320 is divided into a face region, a hair region, a top region, and a bottom region according to color information about the second object 300, and each region may be processed as yellow, black, red/dot, and black. Alternatively, since the second object 300 is a registered person, the interior of the silhouette 320 may be filled with a pre-selected color or pattern to match the corresponding person.

As such, since an avatar or a silhouette is generated by reflecting information about at least one of color, shape, motion, identify, and the like of an object, the a user may determine an attire of the object a posture of the object, and/or whether the object is a registered person, through the avatar or the silhouette. Therefore, the user may easily distinguish the object even though the object is masked, and confirm the detailed motion of the object.

The embodiments in which masking is performed in the monitoring device 1 will be described according to the above descriptions. In the following embodiments, it is assumed that the first object 200 and the second object 300 have the characteristic information illustrated in FIG. 3.

Figure 8:
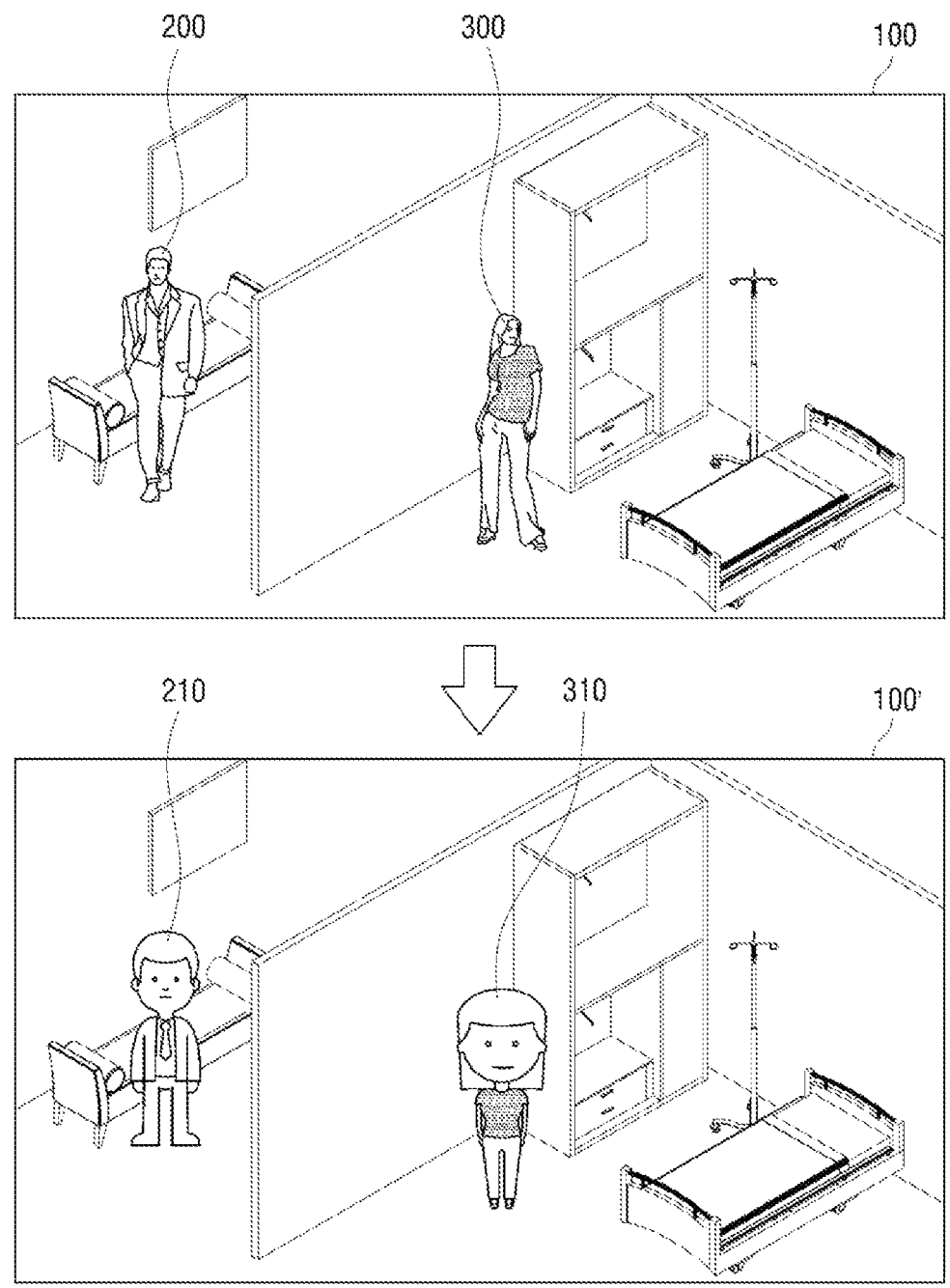
FIG. 8 illustrates an embodiment of performing masking at a monitoring device.

FIG. 8 illustrates a first embodiment of performing masking at the monitoring device. In the first embodiment, the object determiner 60 determines all objects in the image 100 as a masking target.

When the image 100 is received through the I/O interface 10, the object extractor 40 extracts the first object 200 and the second object 300 from the background.

The object analyzer 50 analyzes and acquires information about at least one of color, shape, motion, position, size, and identity with respect to the extracted objects 200 and 300.

As the masking target is preset to all objects, the object determiner 60 selects all extracted objects 200 and 300 as the masking target.

The object processor 70 generates the avatars 210 and 310 obtained by reflecting the color information and the size information about the objects 200 and 300, and performs masking using the avatars 210 and 310 generated according to the position information about the objects 200 and 300.

A masked image 100' may be output through the display 30 or may be stored in the image storage 20.

Figure 9:
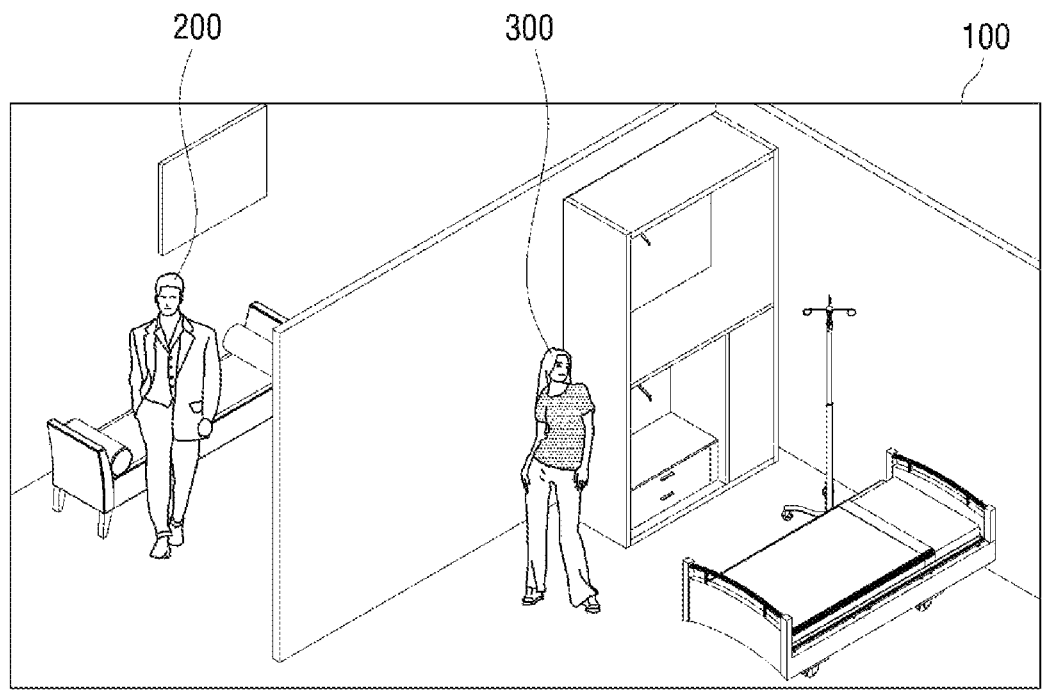
FIG. 9 illustrates an embodiment of performing masking at the monitoring device.
Figure 9:
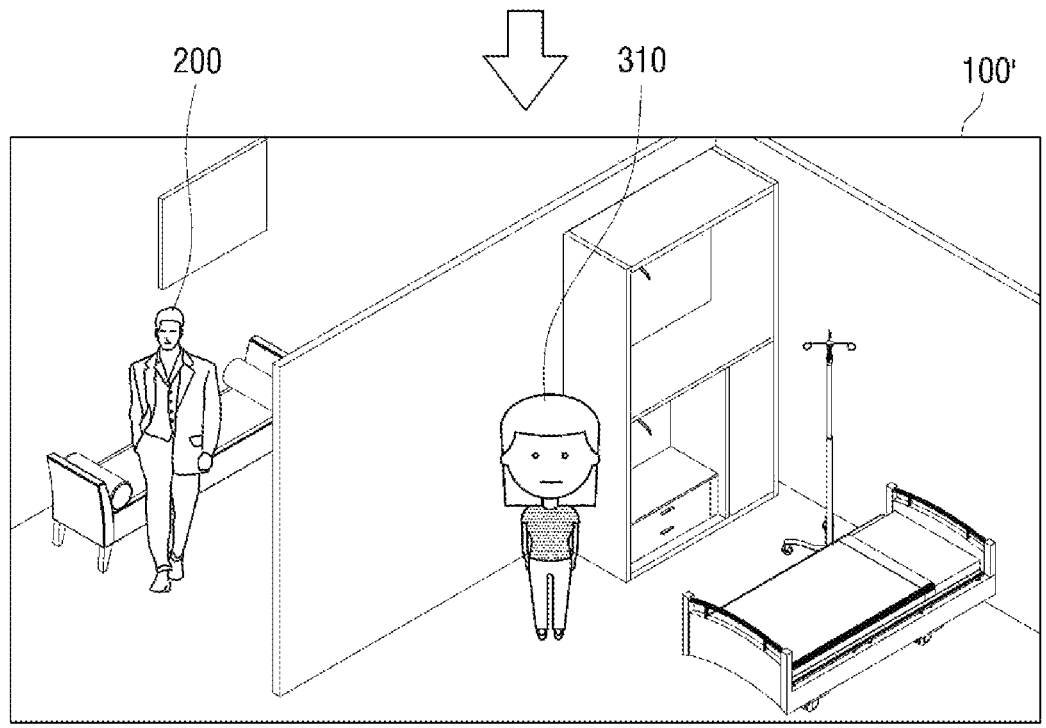

FIG. 9 illustrates an embodiment of performing masking at the monitoring device. In this embodiment, the object determiner 60 determines a corresponding object as a masking target according to a setting value which is previously input.

The user presets a value for characteristic information about at least one of color, shape, motion, position, size, and identity, through the user interface 90. It is assumed that the user sets 'name: R. Green' as the identity information.

The object determiner 60 selects a masking target by comparing the characteristic information acquired by the object analyzer 50 with the setting value. The first object 200 and the second object 300 are objects having the characteristic information illustrated in FIG. 3, and the object determination unit 60 determines that the second object 300 as the masking target.

The object processor 70 generates an avatar 310 obtained by reflecting the characteristic information about the second object 300 determined as the masking target. The avatar 310 may be an avatar obtained by reflecting the color information about the second object 300 or an avatar pre-selected to match with 'R. Green'.

Figure 10:
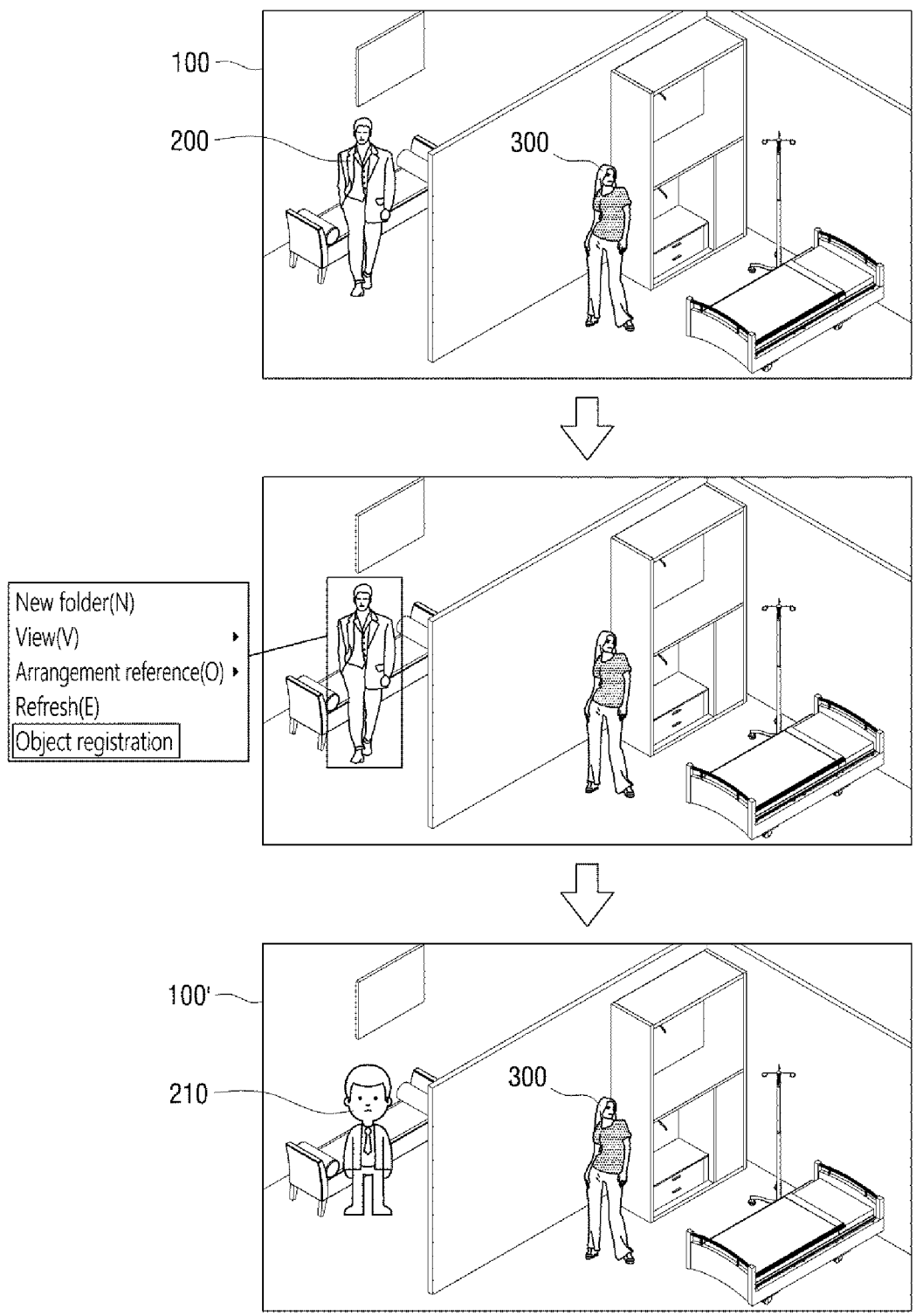
FIG. 10 illustrates an embodiment of performing masking at the monitoring device.

FIG. 10 illustrates an embodiment of performing masking at the monitoring device. In this embodiment, the object determiner 60 determines a masking target according to object designation by a user.

The user may monitor the image 100 and designate a masking target through the user interface 90. It is assumed that the user designates the first object 200 as a masking target.

The object determiner 60 selects the first object 200 designated by the user as the masking target, and the object processor 70 performs masking by generating the avatar 210 obtained by reflecting characteristic information about the first object 200 selected as the masking target.

Figure 11:
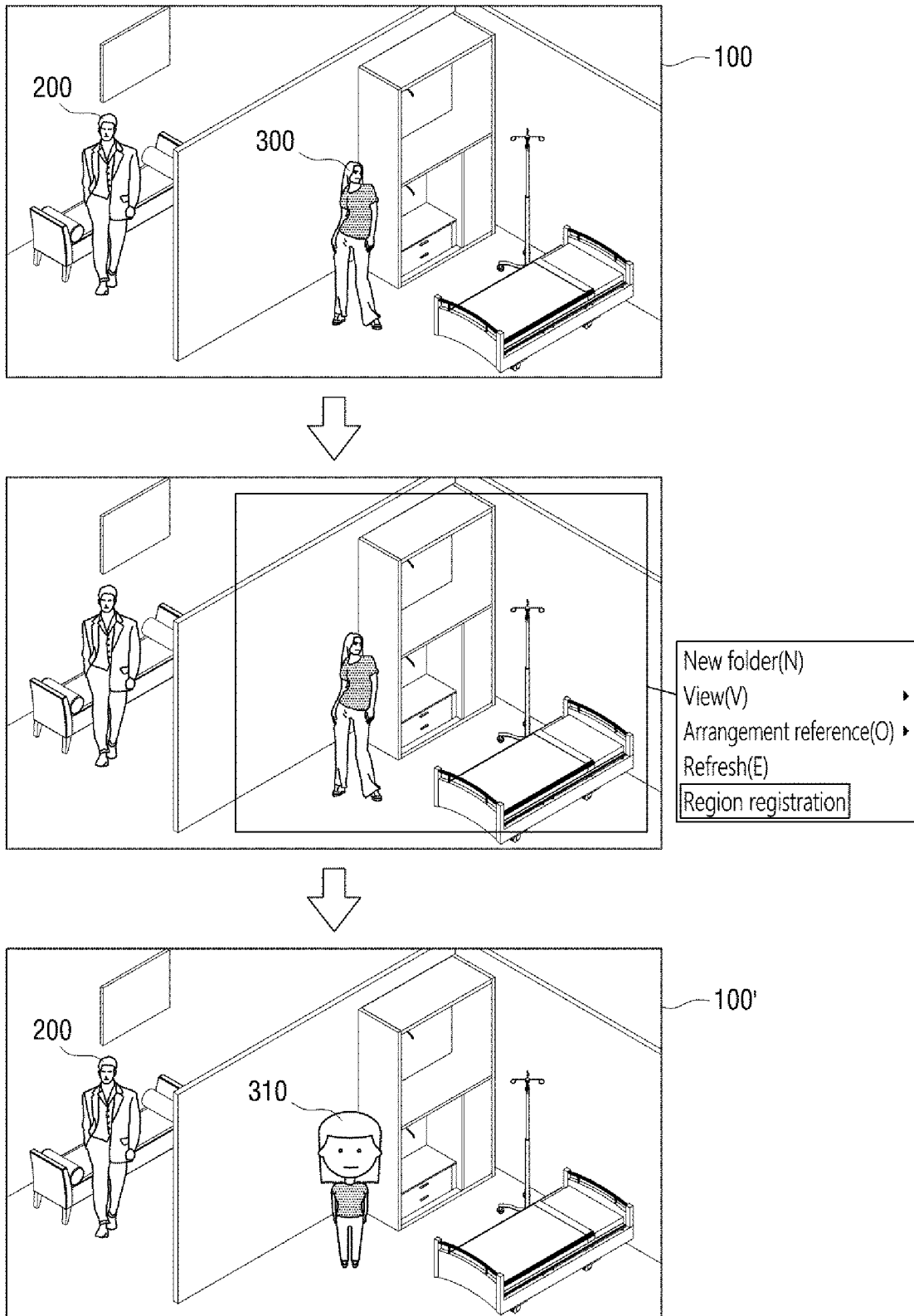
FIG. 11 illustrates an embodiment of performing masking at the monitoring device.

FIG. 11 illustrates an embodiment of performing masking at the monitoring device. In this embodiment, the object determiner 60 determines a masking target according to region designation of the user.

The user may monitor the image 100 and designate a region to be masked through the user interface 90. It is assumed that the user designates a region positioned on the right side of the screen as the masking region.

The object determiner 60 selects the second object 300 positioned in the region designated by the user as the masking target, and the object processor 70 performs masking by generating the avatar 310 obtained by reflecting characteristic information about the second object 300 selected as the masking target.

Also, the user may designate a masking region, and designate sensitivity to the masking region to be higher than other regions.

The object determiner 60 selects the second object 300 positioned in the region designated by the user and satisfying the designated sensitivity as the masking target, and the object processor 70 performs masking by generating the avatar 310 obtained by reflecting the characteristic information about the second object 300 determined as the masking target.

Figure 12:
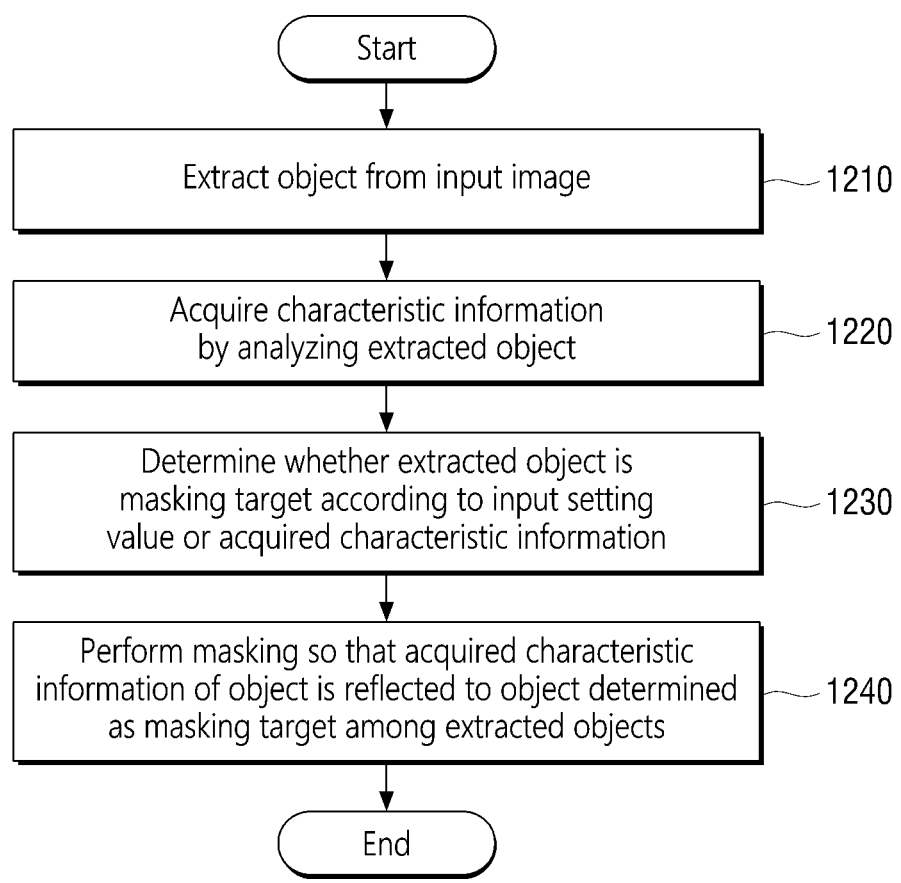
FIG. 12 is a flowchart of an image masking method according to an embodiment of the present invention.

FIG. 12 is a flowchart illustrating an image masking method according to an embodiment. Detailed description of the image masking method according to this embodiment corresponds to the detailed descriptions about the monitoring device 1 of FIGS. 1 to 11.

In operation 1210, an object is extracted from an input image. In operation 1220, characteristic information about the extracted object is obtained by analyzing the extracted object. In operation 1230, it is determined whether the extracted object is a masking target according to at least one of a setting value and the characteristic information. In operation 1240, masking is performed such that the characteristic information about the object is reflected to the object determined as the masking target among objects in the image.

The setting value is set by an input designating at least a partial region in the image, and in the determining whether the extracted object is the masking target, an object positioned in the designated region may be determined as the masking target among the objects in the image.

Alternatively, in the determining whether the extracted object is the masking target, only an object having characteristic information satisfying the setting value among the same type of objects may be determined as a masking target.

Furthermore, in the performing the masking, the masking is performed with respect to the object determined as the masking target using a masking object such as an avatar and/or a silhouette reflecting the characteristic information, and the masking object may be changed according to a change in characteristic information about the object.

The embodiments of the inventive concept can be embodied as computer readable codes on a computer readable recoding medium. The computer readable recoding medium includes all types of recording devices in which data readable by a computer system are stored.

Examples of the computer readable recoding medium include a read-only memory (ROM), a random access memory (RAM), a compact disc (CD)-ROM, a magnetic tape, a floppy disk, an optical data storage device and the like, and further include a medium embodied by a carrier wave (for example, transmission via the Internet). Further, the computer readable recording medium is distributed in a computer system connected through a computer network and computer readable codes may be stored and executed in the distributed manner. Further, functional programs, codes, and code segments for embodying the inventive concept may be easily deduced by programmers in the technical field to which the inventive concept belongs.

At least one of the components, elements, modules or units (collectively "components" in this paragraph) represented by a block in the drawings such as FIG. 2 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The embodiments of the inventive concept have at least the following effects.

Since objects are masked using an avatar or a silhouette obtained by reflecting characteristic information about the objects, it is possible to protect the privacy of the objects while transmitting information about the object to a user (an object monitoring function).

The effects according to the inventive concept are not limited by the contents exemplified above, and other various effects are included in the inventive concept.

Those skilled in the art to which the inventive concept belongs will be able to understand that the inventive concept can be implemented in other detailed forms without changing the technical spirit or an essential characteristic. Therefore, it should be appreciated that the aforementioned exemplary embodiments described above are all illustrative in all aspects and are not restricted. The scope of the inventive concept is represented by claims to be described below rather than the detailed description, and it is to be interpreted that the meaning and scope of the claims and all the changes or modified forms derived from the equivalents thereof come within the scope of the inventive concept.

What is claimed is:

1. An image masking method of a surveillance system in which a processor and a memory are included and an operation is controlled by the processor, the image masking method comprising:

extracting an object from an image;
obtaining characteristic information of the extracted object by analyzing the extracted object in an image;
designating a specific region in the image based on a user input;
comparing the characteristic information with a database to analyze whether the extracted object is a registered person;
selecting the extracted object as a masking target when the extracted object is not the registered person;
detecting whether the extracted object is positioned in the specific region; and
performing selective masking on the extracted object according to whether the extracted object is positioned in the specific region,
wherein the performing of the selective masking includes:
not performing masking on the extracted object that is positioned outside of the specific region, and
performing the masking on the extracted object when the extracted object enters the specific region.

2. The image masking method of claim 1, wherein the obtained characteristic information is a characteristic information for monitoring the extracted object.

3. The image masking method of claim 2, wherein in the performing masking on the extracted object, the obtained characteristic information is reflected on the extracted object.

4. The image masking method of claim 3, wherein a silhouette is displayed in the image according to shape information about the extracted object.

5. The image masking method of claim 1, the characteristic information of the extracted object is displayed together with and adjacent to the image.

6. The image masking method of claim 3, wherein the obtained characteristic information comprises information about at least one of color, shape, motion, identity and position.

7. The image masking method of claim 1, wherein the performing the masking comprises:
generating a masking object by reflecting the obtained characteristic information; and
performing the masking on the extracted object determined as a masking target using the masking object.

8. The image masking method of claim 7, wherein the masking object is an avatar on which the obtained characteristic information is reflected.

9. The image masking method of claim 8, wherein at least one of a face, a hair, a top, a bottom, a gender, and an age of the avatar is determined according to the obtained characteristic information.

* * * * *